Dec. 3, 1963 E. L. ANDERSON ETAL 3,113,013
ARTICLE FORMING MACHINE WITH SELECTIVE DISCHARGE MEANS
Filed June 30, 1958 2 Sheets-Sheet 2

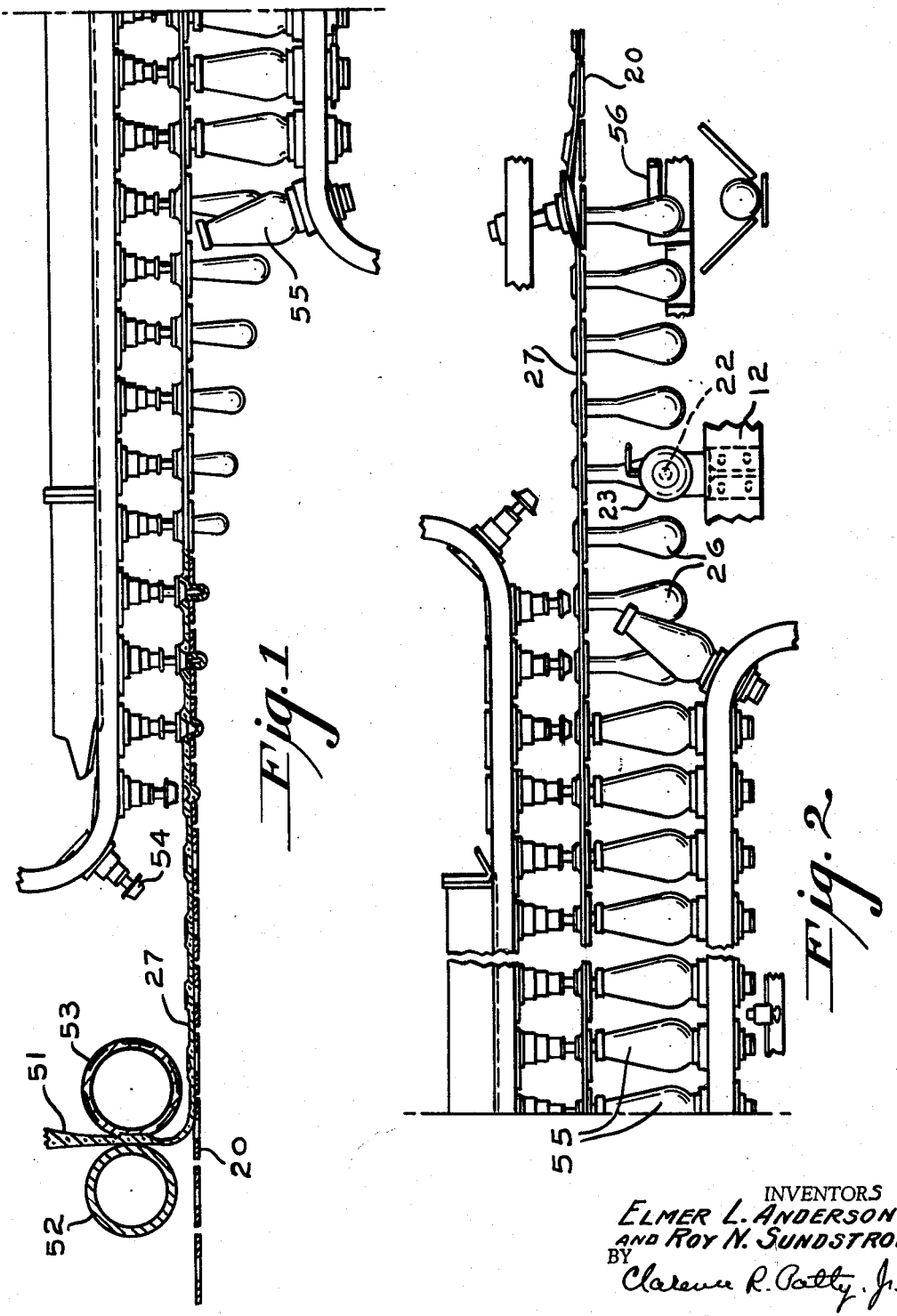

INVENTORS
ELMER L. ANDERSON
AND ROY N. SUNDSTROM
BY Clarence R. Patty, Jr.
ATTORNEY United States Patent Office 3,113,013
Patented Dec. 3, 1963

3,113,013
ARTICLE FORMING MACHINE WITH SELECTIVE DISCHARGE MEANS
Elmer L. Anderson and Roy N. Sundstrom, Corning, N.Y., assignors to Corning Glass Works, Corning, N.Y., a corporation of New York
Filed June 30, 1958, Ser. No. 745,382
6 Claims. (Cl. 65—177)

The present invention relates to multi-mold article forming machines wherein the formed articles are ejected from the machine at a suitable delivery position.

The invention is particularly concerned with the provision of facilities, associated with such a machine, which enables the selection of each of those articles whose formation has involved the use of a specified mold, or other element or a combination of specific elements of the machine in its production and for its ejection from the machine at an auxiliary delivery position located in advance of the regular delivery position, without interference with the subsequent ejection of the other articles formed by the machine upon their arrival at the regular delivery position.

The articles delivered at the auxiliary position can thus be evaluated for their quality and/or dimensions compared to others produced by the machine. Defects in or the malfunctioning of certain elements of the machine can thus be readily located and corrected. Alternatively, such facilities may be employed to select articles produced by use of a certain element or elements of the machine and known to have highly desirable characteristics rendering them valuable for uses for which other articles produced on the machine are unsuitable.

The invention, although not limited to application to machines having a high rate of production, finds maximum utility therein. For the purpose of describing the invention, applicant has, accordingly, elected to describe it as applied to a well-known form of glass article blowing machine employed in the formation of incandescent lamps and electronic tube envelopes. One such machine is fully shown and described in United States Patent No. 1,790,397 issued January 27, 1931, to David E. Gray and William J. Woods. In such a machine a given mold of a chain thereof, successively, becomes associated with different orifice plates of a chain thereof and, similarly, different blowheads of a chain thereof, successively, become associated with different ones of such plates. In the operation of such a machine, a ribbon of glass is deposited on the orifice plates as they travel about a closed path. Hollow articles are formed by the glass sagging through the plate orifices and are blown to form by blowheads, temporarily associated therewith after molds close thereabout. After the articles are formed they leave their forming molds and are ejected from the machine by a subsequently encountered ejector, also often referred to as a crack-off device. In the above patent, such ejector simply comprises a bar in the path of the finish articles that breaks them away from their supporting orifice plates or from the glass ribbon which passes on to a cullet chute. In similar later machines, the ejectors have usually been in the form of hammers driven from the machine drive shaft, as illustrated, for example in United States Patent No. 1,776,556 issued Setpember 23, 1940, to David E. Gray et al. and No. 2,091,494 issued August 31, 1937 to H. H. Snyder.

According to the invention a second article ejector is located at an auxiliary delivery position in advance of the regularly provided ejector, and facilities are provided whereby the second ejector will be operated whenever an article produced with the aid of any particular selected element of the machine arrives at such auxiliary delivery position. As will be understood, the remainder of the articles produced by the machine proceed past the auxiliary delivery position and are ejected at the usual delivery position.

For a better understanding of the invention, reference is made to the accompanying drawing wherein:

FIGS. 1 and 2 together constitute a longitudinal central vertical section through a machine such as disclosed in above Patent No. 1,790,397 and embodying the present invention.

Figure 3:
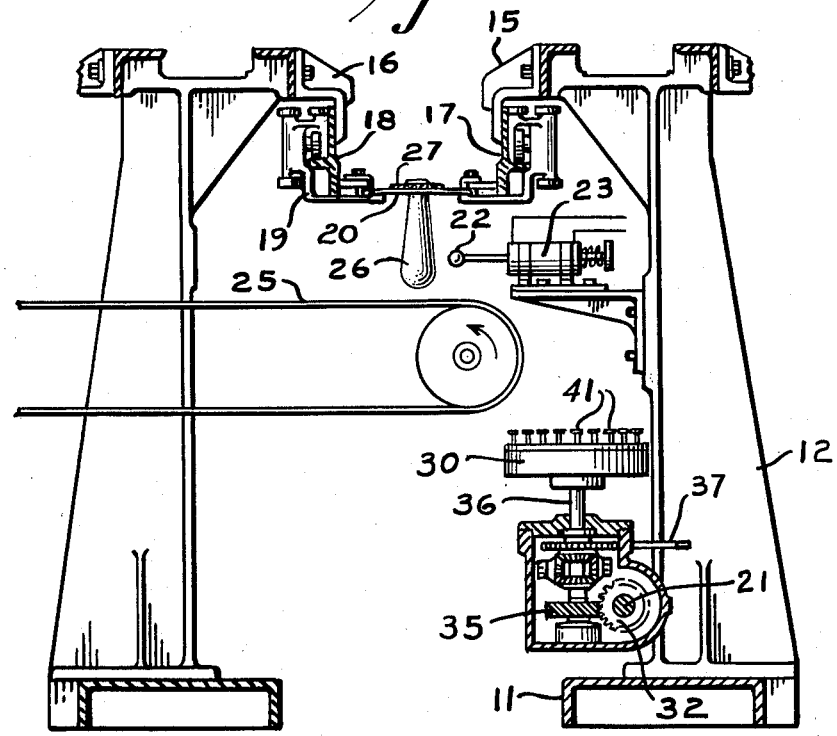
FIG. 3 is a view in end elevation of a section of a glass ribbon type bulb blowing machine, in the region between the end of its chain of molds and its article delivery position, provided with a magnetically operable article ejector, an element selector switch driven by the machine, and with associated manually operable switches.

Referring first to FIGS. 1 and 2, and as fully described in the above referred to Patent No. 1,790,397, a stream of molten glass 51 is fed through ribbon forming rolls 52 and 53 onto orifice plates 20 of a traveling chain thereof. Blowhead units such as 54, subsequently become associated with the glass of the ribbon 27 overlaying the orifice plate orifices to aid gravity in forming such glass into bulbous bodies. Molds, such as 55, subsequently temporarily close about such bodies while air supplied through the blowheads 54 blow them into bulbs such as 26. As illustrated, such bulbs are separated or ejected from the parent ribbon of glass 27 upon encountering a crack-off bar 56.

According to the invention, however, an ejector 22 is provided in advance of the bar 56 to, under certain circumstances, crack-off a bulb before its supporting orifice plate can advance it into engagement with bar 56.

Figure 4:
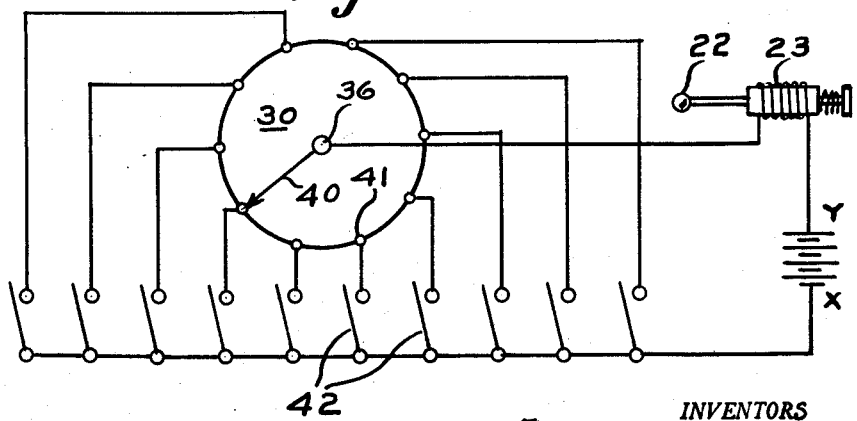
FIG. 4 is a circuit diagram showing the ejector, its operating circuits through the selector switch and the manually operable switches.

Referring to FIGS. 3 and 4, the bulb blowing machine includes parallel bed members such as 11 to which standards such as 12 are secured at spaced intervals along its length. These standards, at their upper ends, support brackets 15 and 16 to which the orifice plate chain track rails 17 and 18 are attached. Supporting the traveling chain 19 of orifice plates 20. A main drive shaft 21 extends longitudinally of the machine near the lower ends of the standards and serves to transmit power to the chain 19 and to other moving parts of the machine, only a driving connection having to do with the invention being shown.

An article receiving conveyer 25, of any well-known form is so positioned with respect to an orifice plate 20 at the auxiliary ejecting position as to receive the formed articles 26 severed from the supported ribbon 27 of glass by the associated ejector 22. Ejector 22 may be of any suitable form but, for the sake of simplicity, has been illustrated as a hammer adapted to be actuated by a solenoid 23 whenever the same is momentarily energized.

The selector switch 30 comprises a drive shaft 36 driven off the main drive shaft 21 of the machine through the medium of gears 32 and 35 of such ratio as to cause the wiper 40 attached to shaft 36 to successively engage contacts 41 as bulbs whose production involved elements individual to respective ones of said contacts arrive at the auixiliary delivery position, such for example as an orifice plate 20, a mold 55 or a blowhead 54. Preferably the drive includes suitable adjusting facilities operable by a shaft 37 to enable the rotary position of shaft 36 to be varied in known manner with respect to shaft 21 for precisely turning the engagement of the wiper 40 (FIG. 2) of the selector switch 30 with its fixed contacts such as 41 coincident with the arrival of a bulb 26 at the auxiliary position. The ejector solenoid 23 is included in an operating circuit individual to any such contact 41 whose associated manually operable switch such as 42 has previously been closed, to render the ejector operative upon the arrival of a bulb 26 that is a product of a particular selected element of the machine at the auxiliary ejecting position.

Ordinarily, as indicated above, the selector switch 30 would have a fixed contact such as 41 for each element of a group thereof in the machine, but for the sake of simplification, is shown with its wiper 40 having access to but 10 of such contacts. As will be understood the contacts 41 are momentarily engaged in succession as the articles produced by elements represented thereby enter the auxiliary ejector position and complete an operating circuit for solenoid 23 whenever wiper 40 passes over a contact whose associated manually operable switch has been actuated. Thus the articles formed through the medium of any or all of the ten so identified elements may be preseletced and ejected at the auxiliary delivery position, whereas the remaining articles formed on the machine pass such auxiliary position on to the regular ejecting position.

Although the invention has been illustrated and described as adapted for selecting articles from any or all of a group of elements of the machine, obviously, the selection of articles produced through the medium of a particular mold, orifice plate or blowhead or through the medium of a combination or sub-combinataion of such elements can be arranged for without departing from the spirit or scope of the invention as claimed.

What is claimed is:

1. In a glass blowing machine wherein a molten ribbon of glass is fed to a continuously moving conveyor comprising a chain of plates having orifices through which the molten ribbon sags into bulbous articles blown to final form in blow molds temporarily arranged thereabout with air supplied thereto by blowheads engaging the ribbon at the boundary regions of such orifices and wherein there is an ejector at a delivery position at which normally all of the articles formed are ejected from the ribbon, the improvement which comprises the provision at a second delivery position in such machine through which the articles must pass to arrive at the first specified delivery position, an ejecting mechanism at such second delivery position means operable at will to preselect the elements from association with which articles are to be ejected at the second position, and means driven by the machine for activating the ejecting mechanism at such second position in accordance with such preselection.

2. A machine as in claim 1, wherein the ejecting mechanism at the second delivery position has a magnet for operating it; and the means effecting such preselection comprises a switch, having successively engageable contacts individual to the respective elements and operating circuits for said magnet including the contacts of said switch and contacts manually operable to activate selected ones of said circuits.

3. The combination with a glass blowing machine embodying orifice plate elements upon which a ribbon of molten glass is deposited and through whose orifices glass sags in bulbous forms and becomes temporarily surrounded by mold elements and then blown in to articles by air supplied thereto by blowhead elements engaged therewith and which has an ejector at a delivery position at which normally all of the articles are ejected from the ribbon, of other means for ejecting articles from the ribbon available for use before the articles arrive at such delivery position, means for preselecting one of such elements from which an article is to be ejected by such other ejecting means, means driven by the machine for bringing about the actuation of said other ejecting means whenever any selected one of said elements has been involved in the production of an article, becomes positioned opposite said other ejecting means, and means for modifying such selection at will.

4. The combination with an article forming machine having a plurality of traveling elements employed in the formation of articles and having one delivery position at which means is provided for dis-associating formed articles fro all of such elements as they pass such position, of an auxiliary delivery position having associated means for dis-associating formed articles from such elements before their arrival at said one delivery position, means operable at will to pre-select those articles whose formation have involved the employment of a particular element of the machine and means driven by the machine for activating the latter dis-associating means only upon the arrival of a selected article at such auxiliary delivery position.

5. A combination such as defined by claim 4 wherein the pre-selecting means includes devices operable to make available to the means driven by the machine the means for effecting dis-association from the machine of those articles whose formation have involved the employment of any of a pre-selected group of such elements.

6. The combination with an article forming machine having a plurality of travelling elements employed in the formation of articles and having one delivery position at which means is provided for disassociating formed articles from all of such elements as they pass such position, a device embodied in the machine for disassociating formed articles from selected ones of such elements before their arrival at said one delivery position, means for selectively operating said device including a switch driven by the driving means for the travelling elements, said switch having a wiper successively available to contacts individual to such elements and operating circuits for said device including said switch and manually operable switches of a group thereof for activating selected ones of said circuits.

References Cited in the file of this patent

UNITED STATES PATENTS

| 1,776,556 | Gray et al. | Sept. 23, 1930 |
| 1,904,959 | Soubier | Apr. 18, 1933 |
| 2,077,684 | Gensburg | Apr. 20, 1937 |
| 2,217,342 | Ladrach | Oct. 8, 1940 |
| 2,280,167 | Soubier | Apr. 21, 1942 |
| 2,315,287 | Holloway | Mar. 30, 1943 |
| 2,663,421 | Reynolds | Dec. 22, 1953 |
| 2,732,655 | Cassell | Jan. 31, 1956 |
| 2,789,680 | Kerr | Apr. 23, 1957 |
| 2,834,156 | Oberlin | May 13, 1958 |
| 2,972,409 | Mullan et al. | Feb. 21, 1961 |

FOREIGN PATENTS

| 368,335 | Great Britain | Mar. 1, 1932 |